Sept. 2, 1958   F. A. O'NEALL   2,850,533
GUANIDINE NITRATE RECOVERY
Filed Dec. 13, 1956
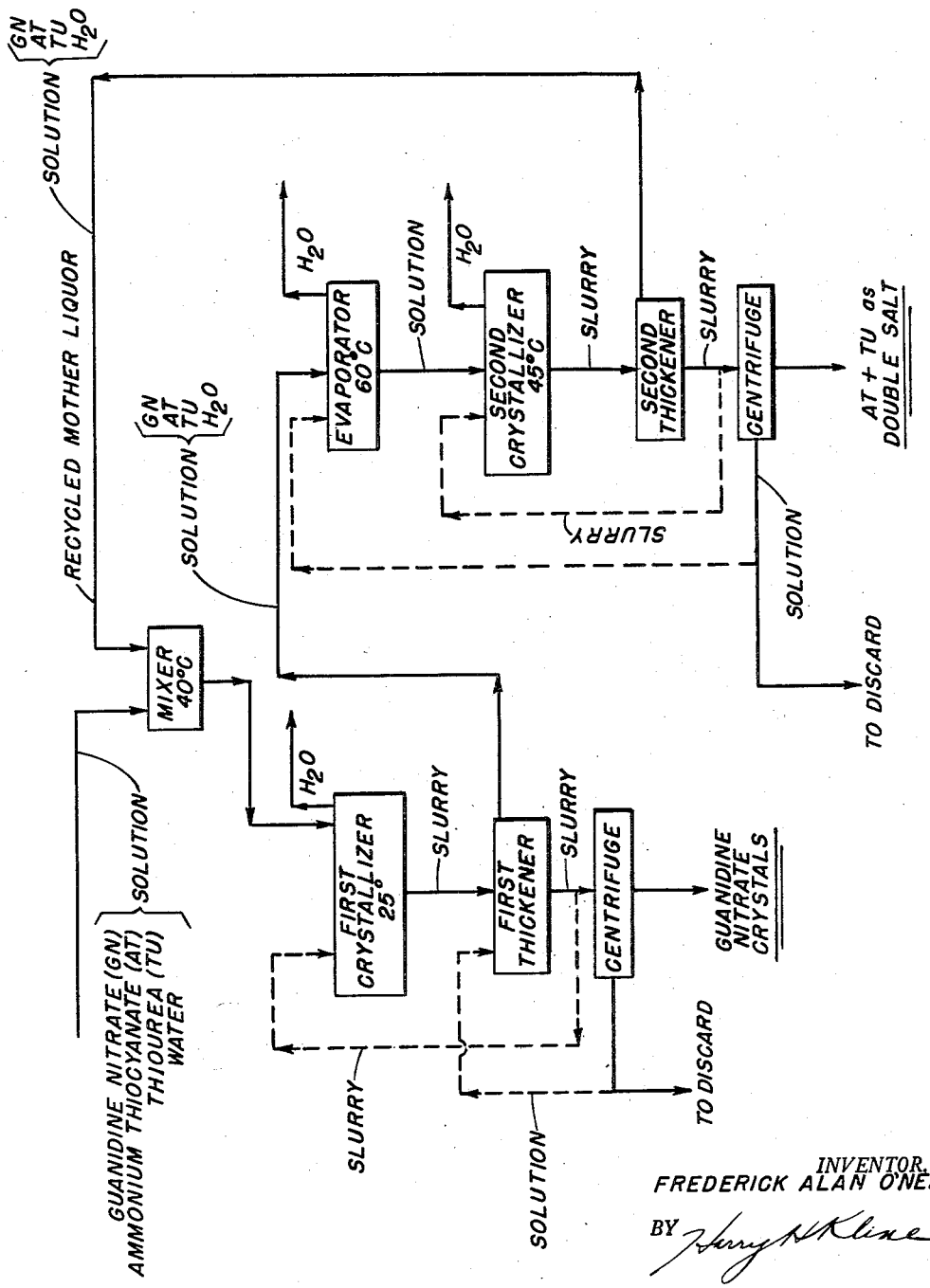
INVENTOR.
FREDERICK ALAN O'NEALL,
BY
ATTORNEY.

United States Patent Office 2,850,533
Patented Sept. 2, 1958

2,850,533
GUANIDINE NITRATE RECOVERY

Frederick Alan O'Neall, Brewster, Fla., assignor to American Cyanamid Company, New York, N. Y., a corporation of Maine Application December 13, 1956, Serial No. 628,074

5 Claims. (Cl. 260—564)

The present invention relates to the recovery of pure, uncontaminated guanidine nitrate. More particularly, it relates to the quantitative recovery of pure, uncontaminated guanidine nitrate from a mixture comprising an aqueous solution of guanidine nitrate, ammonium thiocyanate and thiourea.

In recent years, guanidine nitrate has been prepared by fusing ammonium thiocyanate to obtain guanidine thiocyanate and then reacting resultant guanidine thiocyanate with an aqueous solution of ammonium nitrate to obtain a solution comprising guanidine nitrate, ammonium thiocyanate and thiourea. Guanidine nitrate has been removed from this solution by crystallizing out guanidine nitrate and ammonium thiocyanate as a mixture. The latter mixture was then treated to separate the two salts, usually by a froth flotation wherein guanidine nitrate is floated and removed.

Unfortunately, a pure, uncontaminted guanidine nitrate in quantitative yields cannot be recovered by employing the above-outlined process. During treatment, the presence of thiourea in the initial mixture produces a double salt with ammonium thiocyanate which double salt contaminates the recovered products. Accordingly, the mechanical separation of the crystalline products cannot be readily accomplished, if at all, by known techniques. If the products could each be separated and recovered, such would be highly desirable.

It is an object of the present invention, therefore, to provide a method for separating guanidine nitrate in a substantially pure and uncontaminated form from a reaction mixture containing ammonium thiocyanate, thiourea and guanidine nitrate. It is a further object of the invention to provide a process for recovering substantially pure guanidine nitrate in quantitative yields by utilizing a series of crystallization steps with the elimination of known froth flotation techniques.

To this end, the above and other objects apparent to those skilled in the art can be accomplished in a simple and straightforward manner employing a new and novel series of treating steps. These are applied to a crude aqueous reaction mixture of guanidine nitrate, ammonium thiocyanate and thiourea obtained from the above-noted, double decomposition of ammonium nitrate and guanidine thiocyanate.

According to the present invention, it has been discovered that much of the difficulty in the past has been due to the failure to realize that this mixture was too dilute in guanidine nitrate. Usually, also, it was at too high a temperature for effective crystallization of the nitrate salt without at the same time crystallizing contaminant salts such as the double salt of thiourea and ammonium thiocyanate. In the present process, both problems are solved in a single operation without evaporation or external cooling by enriching the crude product mixture with a circulating load of dissolved residual guanidine nitrate.

In general, the solids content of the crude reaction mixture has been observed to be within the range of from about 35% to 55% by weight, although mixtures containing lesser solids content can be similarly processed. Surprisingly, it has been found that the enrichment of the crude reaction product mixture in guanidine nitrate by increasing the solids content of the mixture to about 60% or above permits separation and recovery of substantially pure, uncontaminated guanidine nitrate in quantitative yields for the first time. Solids contents of from about 60% to about 85% will be generally used. Higher percentages of solids content may be used, but the resulting dense mixture usually becomes too unwieldy to handle conveniently.

According to the present invention, this enrichment is accomplished by means of a recycled mother liquor which is obtained after removing some of the secondary products obtained in each cycle. While this liquor will not only contain guanidine nitrate but also some ammonium thiocyanate and thiourea, the proportions therein and the water content are not those of the crude reaction mixture which constitutes the feed. This recycle liquor is obtained from a previous step in the overall cyclic process of the present invention, as will be explained more fully as the description proceeds.

Advantageously, the process of the invention may be carried out batchwise, semi-continuously or continuously. For practical operation, it is preferred as most advantageous to carry out the process in a continuous manner. Therefore, this mode of operation will be taken as illustrative. Application of the principles discussed to other procedures will be readily apparent.

A preferred embodiment of the invention is illustrated in the accompanying drawing. Reference to it will assist in a ready understanding of the ensuing description.

Enriched aqueous mixture comprising crude aqueous reaction mixture and recycled mother liquor is adjusted in a mixing zone to a temperature of from about 35° C. to about 60° C. It is then introduced into a first or nitrate crystallizer which is maintained at a temperature of from about 15° C. to 30° C., and preferably at an average temperature of about 25° C. Ordinarily, the crystallizer is under vacuum so that sufficient water may be easily withdrawn to insure production of a slurry in the crystallizer.

Resultant slurry is then subjected to a thickening separation operation, whereby guanidine nitrate crystals are removed as underflow and a clear aqueous solution comprising some residual dissolved guanidine nitrate, ammonium thiocyanate and thiourea is withdrawn as overflow. Thickener underflow slurry is then centrifuged or otherwise treated to collect the product, guanidine nitrate. Solution which usually contains a small amount of guanidine nitrate crystals (obtained in the centrifuge step) may be returned to the thickener.

In the process of the present invention a novel advantage is obtained by providing this separate thickening operation. Once operating conditions are established, the operating slurry density within the first or "nitrate" crystallizer conveniently and easily may be increased to and maintained at a much higher level than in the incoming feed. This is accomplished by introducing a portion of the thickener underflow slurry into the crystallizer. For example, in starting up, the slurry density obtained in the nitrate crystallizer from the initially fed mixture may be in the range of from about 5% to 7% solids, by weight. However, once the thickener is in operation, the slurry density may be increased to a solids content of approximately 30%–35% by recycling a portion of the underflow slurry issuing from the thickener. Thus, a feature of the operation of the present process is in the use of a slurry density in the crystallizer which is much higher than that of the feed.

Overflow solution from the thickener contains some guanidine nitrate and the secondary reaction products.

As a first step in recovering the former and discharging the latter, this overflow liquor is treated to remove water. In the illustrative case, substantial quantities of water are evaporated at a temperature of from about 50° C. to 100° C., usually of from 60° C. to 70° C. Resultant liquor is passed into a second or "thiocyanate" crystallizer, usually maintained at an average operating temperature in the range of from about 35° C. to about 55° C., under vacuum. However, one feature of the present process is the selection and control of an operating temperature within this range. It is essential that the average operating temperature of the "thiocyanate" crystallizer be maintained about ten degrees, or more, above that in the first or nitrate crystallizer. Otherwise, a portion of the residual dissolved guanidine nitrate content will also separate from the solution with the secondary products in the "thiocyanate" crystallizer. As will be seen from the description hereinafter, this would cause loss of product desired.

Slurry from the thiocyanate crystallizer is introduced into a second thickening zone from which a densified underflow slurry containing ammonium thiocyanate and thiourea in the form of its double salt with ammonium thiocyanate, is removed and then centrifuged or otherwise treated to remove therefrom the mixed crystal content.

Resultant liquor from the crystal separating operation contains a comparatively small amount of guanidine nitrate and can, if desired, be discarded. However, as shown, a portion optionally may be recycled to the evaporating step, if necessary or desirable.

Again, as in the nitrate thickening and separation, a portion of the thickener underflow slurry, prior to crystal separation, optionally may be recycled to the thiocyanate crystallizer to increase the slurry density therein. This increase is desirable and advantageous for several reasons including the fact that lesser quantities of solution need be subjected to the centrifuge treatment. In general, it is a good practice to increase and maintain the slurry density to about 30% solids content.

The overflow from the second thickener comprises an aqueous solution of guanidine nitrate, ammonium thiocyanate and thiourea. This constitutes the recycled mother liquor which, as mentioned above, is recycled to the initial mixing zone for purposes of enriching the initial feed of crude reaction mixture comprising guanidine nitrate, ammonium thiocyanate and thiourea.

It is a particular feature and advantage of the present invention that this recycled mother liquor is used in adjusting the relatively dilute crude feed mixture of guanidine nitrate, ammonium thiocyanate and thiourea to a liquor from which guanidine nitrate crystals are directly recovered without the objectionable contamination by the double salt of thiourea and ammonium thiocyanate which troubled the previous practice. Double salt formation is substantially eliminated. Even though double salt may form in the first thickening zone, it is very fine in size and negligible in amount, usually much less than one percent. It is so fine that it all comes to the surface of the solution in the nitrate thickener as a slight haze thereon and is removed with the overflow solution. Recovery of guanidine nitrate crystals in quantitative yields and in substantially pure form has been made commercially practicable for the first time by following the procedure of the present invention.

A preferred embodiment of the invention is described below with particular reference to the accompanying drawing. It should be understood that this embodiment is not to be taken as limitative of the invention but is merely illustrative thereof. Unless otherwise stated, the parts given are by weight.

*Example*

A mixture obtained from the fusion of ammonium thiocyanate and the double decomposition of the resultant guanidine thiocyanate by means of aqueous ammonium nitrate is found to contain about 100 parts of guanidine nitrate, 95.4 parts of ammonium thiocyanate, 13.1 parts of thiourea and 311 parts of water. This mixture, containing a solids content of approximately 40%, is next adjusted by admixture with a recycled mother liquor containing 427 parts of guanidine nitrate, 716 parts of ammonium thiocyanate, 156.8 parts of thiourea and 120.9 parts of water. Resultant adjusted mixture which contains a solids content of about 75% is also brought to a temperature of approximately 40° C. during the mixing. Adjusted mixture is then removed to a crystallizer which is operated at a temperature of about 25° C. under vacuum (8 mm. Hg pressure). About 22.9 parts of water are removed by evaporation so as to maintain the crystallizer temperature despite the higher feed stream temperature. Such water removal insures the maximum recovery of guanidine nitrate.

About 100 parts of guanidine nitrate is crystallized from the feed solution together with a very small amount (less than about 1%) of double salt containing one part of ammonium thiocyanate and four parts of thiourea. Slurry from the crystallizer is continuously discharged to a rake-type gravity thickener. Guanidine nitrate crystals settle therein and are removed in a thick slurry as underflow. Residual liquor overflows to the next operation of the process. The small amount of double salt in fine crystalline form does not settle but rather rises to the surface of the liquor and is removed with the overflow mother liquor. The latter is found to contain 427 parts of guanidine nitrate, 811 parts of ammonium thiocyanate, 169.9 parts of thiourea and 409 parts of water.

Underflow slurry from the first thickener which comprises guanidine nitrate crystals is next centrifuged. One hundred (100) parts of pure, uncontaminated crystals are recovered. However, a portion of the underflow slurry from the thickener may be recycled to the first or nitrate crystallizing zone as shown by the broken lines in the drawing, so that the slurry density (weight of crystals divided by the weight of total slurry) is increased from 5.1% to and maintained at from about 30% to about 35%. Simultaneously, a portion of the underflow slurry from the second thickener is recycled to the second or thiocyanate crystallizer as shown by the broken lines in the drawing so as to increase the slurry density in the second crystallizer from 7.1% to and maintained at from approximately 25% to about 30%.

The thickener overflow liquor is concentrated in an evaporator maintained at about 60° C. whereby about 256 parts of water are removed. Concentrated liquor is next introduced into a second or thiocyanate crystallizer held at a temperature of about 45° C. under vacuum (13 mm. Hg pressure). Temperature of the liquor drops from about 60° C. to about 45° C. therein. Ammonium thiocyanate and double salt are crystallized. Substantially no guanidine nitrate comes out of solution. Crystallizer slurry is discharged to a second thickener of the continuous filter type.

Underflow slurry is then removed from the thickener and introduced into a centrifuge. A solids mixture which analyzes as 95.4 parts of ammonium thiocyanate and 13.1 parts of thiourea is recovered.

Overflow liquor from the second thickener is recycled to the mixing zone to adjust the feed of crude reaction mixture. As noted above, recycled mother liquor comprises 427 parts of guanidine nitrate, 716 parts of ammonium thiocyanate, 156.8 parts of thiourea and 120.9 parts of water.

I claim:

1. In a process of recovering guanidine nitrate from an aqueous feed solution containing dissolved guanidine nitrate, thiourea and ammonium thiocyanate and having a solute content below about 60% by weight; wherein water is removed from said feed solution in amount sufficient to precipitate guanidine nitrate, whereby contaminant solids in minor amount are also precipitated; so-precipitated solids are collected as guanidine nitrate product; and the residual guanidine nitrate-containing liquor is concentrated to above about a 60% solute content by water removal and recycled, being combined with additional feed solution; the improved treatment to selectively recover said guanidine nitrate product substantially uncontaminated by said coprecipitated solids which comprises, in combination therewith: combining said recycle liquor and feed solution, at temperatures within the range from about 35° C. to about 60° C., in amounts only sufficient to produce a composite liquor having a solute content of from above about 60% to about 85% by weight; then holding resultant composite liquor under reduced pressure, at a temperature of from about 15° C. to about 30° C. whereby water is evaporated and guanidine nitrate crystals precipitate, continuing said evaporation and precipitation only for sufficient time to precipitate so much guanidine nitrate as will produce, with residual liquor, a slurry containing by weight from about 5% to about 7% solids; withdrawing resultant slurry; thickening and settling said withdrawn slurry; withdrawing the resultant overflow solution comprising water and residual dissolved guanidine nitrate, ammonium thiocyanate and thiourea, whereby any double salt of ammonium thiocyanate and thiourea insolubilized during said evaporation is removed as fine solids floating on said overflow solution; removing resultant thickened underflow slurry containing crystalline solids; and collecting said crystalline solids as said uncontaminated guanidine nitrate product.

2. A process according to claim 1 in which the solute content of said aqueous guanidine nitrate feed solution is from about 35% to 55% by weight.

3. A process according to claim 1 in which said underflow slurry is divided into two flows; one flow is added to said composite liquor in amount sufficient to produce with the liquor being evaporated a slurry containing from about 30% to about 35% solids; and the residual flow is treated to collect said uncontaminated guanidine nitrate product.

4. A process according to claim 1 in which said overflow solution is subjected to treatment comprising: heating said solution at from about 50° to about 100° C., whereby water is removed therefrom, continuing said heating for time sufficient to substantially reduce the water content but insufficient to produce precipitation of solids; holding so-treated solution under vacuum at from about 35° C. to about 55° C., but not less than 10° C. above the temperature of evaporation of said composite liquor, whereby additional water is evaporated and ammonium thiocyanate, thiourea, and double salt crystals are precipitated; continuing said treatment for sufficient time to produce in resultant solution a solute content above about 60% by weight but insufficient to precipitate guanidine nitrate; withdrawing, thickening and settling resultant slurry; withdrawing resultant overflow solution; and using said overflow solution as said recycled concentrated guanidine nitrate-containing liquor.

5. A process according to claim 4 in which the thickened underflow slurry is withdrawn and divided into two flows, one flow being recycled to said vacuum treating step in amount sufficient to produce and maintain with the overflow solution being evaporated a slurry having a solids content of above about 30%.

References Cited in the file of this patent

UNITED STATES PATENTS

| 2,258,612 | Jayne et al. | Oct. 14, 1941 |
| 2,468,067 | Hill | Apr. 26, 1949 |

FOREIGN PATENTS

| 126,782 | Australia | Feb. 11, 1948 |
| 620,030 | Great Britain | Mar. 18, 1949 |